US011784443B2

(12) United States Patent
Roemelsberger et al.

(10) Patent No.: US 11,784,443 B2
(45) Date of Patent: Oct. 10, 2023

(54) MULTIFUNCTIONAL CARRIER AND HIGH VOLTAGE CONTACTOR FOR A BATTERY SYSTEM OF AN ELECTRIC VEHICLE (71) Applicant: Lisa Dräxlmaier GmbH, Vilsbiburg (DE)

(72) Inventors: Florian Roemelsberger, Geisenhausen (DE); Thomas Hackel, Aham (DE); Christian Schmidbauer, Triftern (DE); Mike Hoffmann, Egglkofen (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 69 days.

(21) Appl. No.: 17/557,623

(22) Filed: Dec. 21, 2021

(65) Prior Publication Data
US 2022/0200214 A1 Jun. 23, 2022

(30) Foreign Application Priority Data

Dec. 22, 2020 (DE) ..................... 10 2020 134 688.3

(51) Int. Cl.
H01R 9/00 (2006.01)
H01R 13/70 (2006.01)
H01R 9/26 (2006.01)
H01R 13/41 (2006.01)
H01M 50/507 (2021.01)
B60L 50/60 (2019.01)
H01R 13/04 (2006.01)

(52) U.S. Cl.
CPC ............. *H01R 13/70* (2013.01); *B60L 50/60* (2019.02); *H01M 50/507* (2021.01); *H01R 9/2675* (2013.01); *H01R 13/04* (2013.01); *H01R 13/41* (2013.01); *H01M 2220/20* (2013.01)

(58) Field of Classification Search
CPC ....... H01R 9/2308; H01R 9/2491; H02G 3/09
See application file for complete search history.

(56) References Cited

U.S. PATENT DOCUMENTS

| 8,690,588 | B2* | 4/2014 | Jetton ................. B60R 16/0238 |
| | | | 439/948 |
| 9,462,702 | B2* | 10/2016 | Darr ....................... H05K 7/026 |
| 9,543,674 | B2* | 1/2017 | Wuerstlein ........... H03K 17/955 |
| 11,025,016 | B2* | 6/2021 | Zhong .................... H01R 13/64 |
| 2015/0229071 | A1* | 8/2015 | Degen .................. H01R 13/627 |
| | | | 439/712 |

* cited by examiner

*Primary Examiner* — Phuong Chi Thi Nguyen
(74) *Attorney, Agent, or Firm* — Jacob Eisenberg (57) ABSTRACT

A multifunction carrier for receiving circuit components of a battery system for an electric vehicle is disclosed, wherein the multifunction carrier includes: a busbar assembly with at least one charging connection rail and a drive connection rail; and an insulating housing in which the busbar assembly is embedded, wherein the insulating housing has openings exposing contact surfaces of the connecting rails, and wherein the insulating housing has plug connectors which are designed to provide a pluggable mechanical and electrical contact between the circuit components of the battery system with the open contact surfaces of the connecting rails. The invention further relates to a high-voltage contactor for a battery system of an electric vehicle.

15 Claims, 5 Drawing Sheets

MULTIFUNCTIONAL CARRIER AND HIGH VOLTAGE CONTACTOR FOR A BATTERY SYSTEM OF AN ELECTRIC VEHICLE

CROSS REFERENCE TO RELATED APPLICATIONS

This application claims priority to German patent application DE102020134668,3, filed Dec. 22, 2020, the content of which is hereby incorporated by reference.

BACKGROUND OF THE INVENTION

The present disclosure relates to a multifunctional carrier for receiving circuit components of a battery system for an electric vehicle and to a high-voltage contactor for a battery system of an electric vehicle, in particular a high-voltage contactor which can be plugged fully automatically into the multifunction carrier.

The assembly of circuit components of the battery system of an electric vehicle (electrified or battery-electric) is today associated with considerable effort and cannot be done fully automatically. Thus, a separate component carrier is required for receiving the electrical components and for receiving the insulating parts. When integrating a cable spider, an additional part is required. After assembly, a manual check of workers with regard to counter-tensile testing must be carried out. This is associated with a complex assembly concept with many work steps and auxiliary templates. Furthermore, a separate thermal connection with gap pads or gap fillers including protective films is required.

Currently, high-voltage contactors are used in battery systems for electrified or battery-electric vehicles to switch on, switch off and secure the electrical loads. In order to enable the control electronics or the battery management unit, i.e. battery control unit, to measure the voltage in the intermediate circuit and thus detect the current switching state, voltage taps are used in addition to the HV contactors. These are realized as screwed ring cable lugs or insert plates for flat plug connections which leads to an additional installation effort due to susceptible screw processes or additional HV wiring harness.

The assembly of the circuit components described above is associated with numerous disadvantages. Long assembly times occur, requiring many work steps which goes hand in hand with the risk of incorrect assembly of components, especially for HV-critical components. Furthermore, there are undesirable air and creepage distances, and the thermal connection is not particularly good. In addition, there are large assembly tolerances in the production of the components.

BRIEF SUMMARY OF THE INVENTION

The aim of the present disclosure is to provide a concept for the fully automated production of the circuit components of the battery system of an electric vehicle which overcomes the disadvantages described above.

Furthermore, it is a task of the invention to provide a concept for easier provision of the HV potentials on the HV contactor, thus simplifying the assembly of the HV contactor.

This task is solved by the subject-matter having the features according to the independent claims. Advantageous embodiments are the subject-matter of the dependent claims, the description and the drawings.

The invention is based on the idea of a multifunctional carrier or assembly of a multifunctional carrier which can accommodate HV busbars (busbar combination—also control and HV taps), PCB connectors, wiring harness and electrical components. This can be fed fully automatically, can be welded at HV interfaces and allows mechanical inspection of secondary interlocks. Air and creepage distances can also be considered with lower dimensions due to the insulation. Hotspots in the system can also be connected to a cooling system by means of a heat-conducting plastic or the use of gap pads or gap fillers.

With this solution, all electrical components can be integrated into one component. An integration of the wiring harness in this component is possible without additional carrier. This eliminates manual assembly steps which leads to a higher degree of automation, in particular, a full automation of the assembly work steps is possible. Furthermore, many standard parts, such as screws and nuts, are omitted, so that a protection of the screw waste is also omitted.

The invention is further based on the idea of providing an HV contactor in which the HV potentials of the two HV terminals can be tapped by a plug-in system or flat plug tongues integrated on the contactor. This also eliminates the need for ring cable lugs or flat plugs.

This allows fully automated production of HV contactors or HV switch boxes which results to significant cost savings in the production of the boxes.

Such an HV contactor is more cost-effective in production, since complex screwing processes are no longer necessary and only plugging is required instead. The switching state of each contactor, e.g. main contactors, DC charging contactor, etc. can always be reliably detected. Furthermore, the absence of voltage in the system can be determined efficiently, as was previously with ring cable lugs in the HV wiring harness.

According to a first aspect of the invention, the problem is solved by a multifunction carrier for receiving circuit components of a battery system for an electric vehicle, wherein the multifunction carrier comprises the following: a busbar assembly having at least one charging connection rail and a drive connection rail; and an insulating housing in which the busbar assembly is embedded, wherein the insulating housing has openings, exposing contact surfaces of the connecting rails, and wherein the insulating housing has plug connectors which are designed to establish a pluggable mechanical and electrical contact between the circuit components of the battery system and the open contact surfaces of the connecting rails.

The technical advantage thus obtained is that such a multifunctional carrier can accommodate a plurality of components, such as HV busbars of a busbar assembly, also control and HV taps, PCB connectors, cable assemblies and electrical components. With such a multifunctional carrier all electrical components can be integrated into one component. An integration of the wiring harness in this component is possible without additional carrier. This eliminates the need for manual assembly steps which leads to a higher degree of automation, in particular a full automation of the assembly work steps is possible. Furthermore, many standard parts, such as screws and nuts, are omitted, so that a protection of the screw waste is also omitted.

According to an exemplary embodiment of the multifunctional carrier, the plug connectors are designed to engage into corresponding detent on the circuit components when the circuit components of the battery system are plugged into the plug connectors.

The technical advantage thus obtained is that the connectors ensure safe electrical and mechanical contacting of the circuit components with the multifunction carrier due to the engagement in the corresponding detent of the circuit components. Plugging can be done in a fully automated manner.

According to an exemplary embodiment of the multifunctional carrier, the insulating housing with the plug connectors is formed as a one-piece plastic part, in particular as an injection-molded part.

This achieves the technical advantage that the multifunctional carrier is easy to produce, for example by means of injection molding.

According to an exemplary embodiment of the multifunction carrier, the connectors are formed on an upper side of the multifunction carrier.

This provides the technical advantage that a tool, for example a robot arm, can easily access the connectors in order to attach the circuit components to them.

According to an exemplary embodiment of the multifunction carrier, an underside of the multifunction carrier is provided for cooling the circuit components.

This provides the technical advantage of ensuring efficient cooling of the circuit components. For example, cooling can be carried out by means of a cooling liquid which is guided along the underside of the multifunctional carrier or by means of a thermally conductive plastic which can also be mounted to the underside.

According to an exemplary embodiment of the multifunctional carrier, the connecting rails of the busbar composite run in different planes and a transition between the planes takes place by bending the connecting rails.

This achieves the technical advantage that a spatial connection option is efficiently possible, namely by simply bending the connecting rails in order to guide them from one plane into the room.

According to an exemplary embodiment of the multifunctional carrier, the open contact surfaces of the connecting rails are formed in the different planes of the busbar composite.

This achieves the technical advantage that various connection options are possible. The connections of the multifunction carrier are therefore not limited to a 2-dimensional carrier in the form of a plate, but can be guided 3-dimensionally in space.

According to a second aspect of the invention, the problem is solved by a high-voltage contactor for a battery system of an electric vehicle, wherein the high-voltage contactor comprises the following: a first high-voltage terminal; a second high-voltage terminal; an electrical switching element for switching on and off an electrical connection between the first high-voltage terminal and the second high-voltage terminal; an insulating housing which comprises the electrical switching element and has openings for the two high-voltage terminals; and an interface with a first pin for voltage tapping at the first high-voltage terminal, a second pin for voltage tapping at the second high-voltage terminal, a third pin for controlling the electrical switching element, and a fourth pin for controlling the electrical switching element.

This provides the technical advantage that the production process of the HV contactor can be fully automated which leads to significant cost savings in production. The HV contactor is more cost-effective in production, since no more complex screw driving processes are necessary, and only plugging is required. The switching state of each contactor, e.g. main contactor, DC charging contactor, etc. can always be reliably detected due to the interface for pluggable tapping of the electrical signal. Furthermore, the absence of voltage in the system can be efficiently detected directly at the interface.

The voltage taps at the first high-voltage terminal (HV+ terminal) and at the second high-voltage terminal (HV− terminal) can be used to measure whether, for example, there is a voltage difference, i.e. no current flow, so the contactor is open. The contactor coil can also be controlled via the third and fourth pins.

This means that the coil connections can be controlled by means of this interface, as well as the measurement of the voltage difference at the HV terminals or the HV-Sense contacting can be carried out.

According to an exemplary embodiment of the high-voltage contactor, the first high-voltage terminal can be plugged into a first connecting rail of a multifunctional carrier for receiving circuit components of the battery system of the electric vehicle, in particular a multifunction carrier according to the first aspect of the invention described above; and the second high-voltage terminal can be attached to a second connecting rail of the multifunction carrier.

This achieves the technical advantage that the HV contactor can be produced simply and cost-effectively, as it can be connected to the other components of the system by means of a simple plug-in process. This means that a robot or another automated process can connect the HV contactor to the connecting rails of the multifunctional carrier in a fully automated manner.

According to an exemplary embodiment of the high-voltage contactor, the high-voltage contactor has at least two detents which are designed to engage into corresponding plug connectors of the multifunction carrier when inserting the high-voltage contactor, to establish a pluggable mechanical and electrical connection of the two high-voltage terminals with corresponding connection rails of the multifunctional carrier.

This achieves the technical advantage that the two detents ensure safe electrical and mechanical contacting of the HV contactor with the multifunction carrier. Plugging can be done in a fully automated manner.

According to an exemplary embodiment of the high-voltage contactor, the interface comprises two plug-in tongues for voltage tapping at the two high-voltage terminals and two further plug-in tongues for controlling the electrical switching element.

The technical advantage thus obtained is that the HV signal of the two HV terminals can be easily tapped via the two plug-in tongues and the control signal for the HV contactor can be easily applied via the two further plug-in tongues. Corresponding plugs can be easily attached to the four plug-in tongues.

According to an exemplary embodiment of the high-voltage contactor, the plug-in tongues are formed on a housing side of the high-voltage contactor facing away from the multifunctional carrier.

This provides the technical advantage that the plug-in tongues are easily accessible. For example, a robot arm can access the multifunction carrier from above to contact the two push-in tongues. As an alternative to plugging/contacting the flat terminals for the voltage taps, alternative connection options can also be used, such as wirebonding.

According to an exemplary embodiment of the high-voltage contactor, the four pins of the interface are arranged in a plug.

The technical advantage thus obtained is that the HV signal can be easily tapped via the plug and the control signals of the HV contactor can be easily applied. Furthermore, due to the plurality of pins, the plug allows not only a single electrical signal, but several such signals to be picked up or applied which indicate or control different states of the HV contactor. The plug can be upgraded for potential separation, so that air and creepage distances or insulation are complied with according to the specification.

According to an exemplary embodiment of the high-voltage contactor, the plug is designed on a lateral housing surface of the high-voltage contactor which extends in the vertical direction to the multifunctional carrier.

This has the technical advantage that the connector can be easily picked up, e.g. by a robot arm that accesses the multifunction carrier from above.

The outgoing direction of the plug can be led out upwards, that is in the direction of the top of the multifunction carrier.

According to an exemplary embodiment of the high-voltage contactor, the third pin and the fourth pin provide a coil connection of the electrical switching element for the HV contactor control.

This provides the technical advantage that the HV contactor can be easily controlled via these two additional pins.

According to a third aspect of the invention, the problem is solved by a method for producing a multifunctional carrier for receiving circuit components of a battery system for an electric vehicle, wherein the method comprises the following steps: Providing a busbar assembly having at least one charging connection rail and a drive connection rail; embedding the busbar assembly in an insulating housing, wherein the insulating housing has openings which contact surfaces expose the connecting rails, and wherein the insulating housing has plug connectors which are designed to establish a pluggable mechanical and electrical contact of the circuit components of the battery system and the open contact surfaces of the connecting rails.

This provides the technical advantage that the manufacturing process of the multifunctional carrier can be fully automated which leads to significant cost savings in production.

According to a fourth aspect of the invention, the problem is solved by a method for producing a high-voltage contactor for a battery system of an electric vehicle, wherein the method comprises the following steps: providing a first high-voltage terminal and a second high-voltage terminal for the high-voltage contactor; providing an electrical switching element for switching on and off an electrical connection between the first high-voltage terminal and the second high-voltage terminal; embedding the electrical switching element in an insulating housing having openings for the two high-voltage terminals; and providing an interface having a first pin for voltage tapping at the first high-voltage terminal, a second pin for voltage tapping at the second high-voltage terminal, a third pin to control the electrical switching element, and a fourth pin to control the electrical switching element.

This has the technical advantage that the production process of the HV contactor can be fully automated, resulting in significant cost savings in production.

BRIEF DESCRIPTION OF THE DRAWINGS

Further advantages features and details of the various embodiments of this disclosure will become apparent from 11 the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

In the following, the invention is described in more detail with reference to examples of embodiments and the figures, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C" then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination.

In the following detailed description, reference is made to the accompanying drawings which form a part thereof and which illustrate specific embodiments in which the invention can be carried out. It is understood that other embodiments can also be used and structural or logical changes may be made without deviating from the concept of the present invention. Therefore, the following detailed description is not to be understood in a limiting sense. It is further understood that the characteristics of the various embodiments described herein may be combined, unless otherwise specifically indicated.

The aspects and embodiments are described by reference to the drawings, with the same reference signs generally referring to the same elements. The following description sets out a number of specific details to provide an in-depth understanding of one or more aspects of the invention. However, it may be obvious to a skilled person that one or more aspects or embodiments can be carried out with a lower degree of specific details. In other cases, known structures and elements are represented in a schematic form in order to facilitate the description of one or more aspects or embodiments. It is understood that other embodiments may be used and structural or logical changes can be made without deviating from the concept of the present invention.

The following description relates to high-voltage contactors, in particular HV contactors for a battery system of an electric vehicle.

The high-voltage electrical system in electrically powered vehicles operates with DC voltages between 400 V and 800 V which are life-threatening for people. In order to ensure the necessary safety, the high-voltage part (HV) and the 12 V on-board electrical system (LV) are completely isolated from each other. A major challenge for the safety of electric vehicles is the timely detection of insulation faults between the different potentials and, if necessary, the disconnection of the affected circuits. The minimum insulation resistance of the electrical system shall be ensured over the entire service life and under all operating conditions. Special high-voltage (HV) contactors provide safe isolation and, in conjunction with a fuse, provide the necessary protection against an electric shock.

The contactor is an electrically or electromagnetically operated switch for high electrical power (in the high-voltage range) and resembles a relay. The contactor knows two switching positions and normally switches monostable without special precautions. If a control current flows through the solenoid coil of an electromechanical contactor, the magnetic field pulls the mechanical contacts into the active state. Without current, a spring restores the idle state and all contacts return to their initial position. The connections for control current for the solenoid coil as well as the contacts for auxiliary circuits (if any) and currents to be switched are insulated from each other in the contactor: there is no conductive connection between control and switching contacts. This makes the contactor a relay with significantly higher switching power, suitable for the high-voltage range. Typical loads start from around 500 watts up to several hundred kilowatts.

Figure 1:
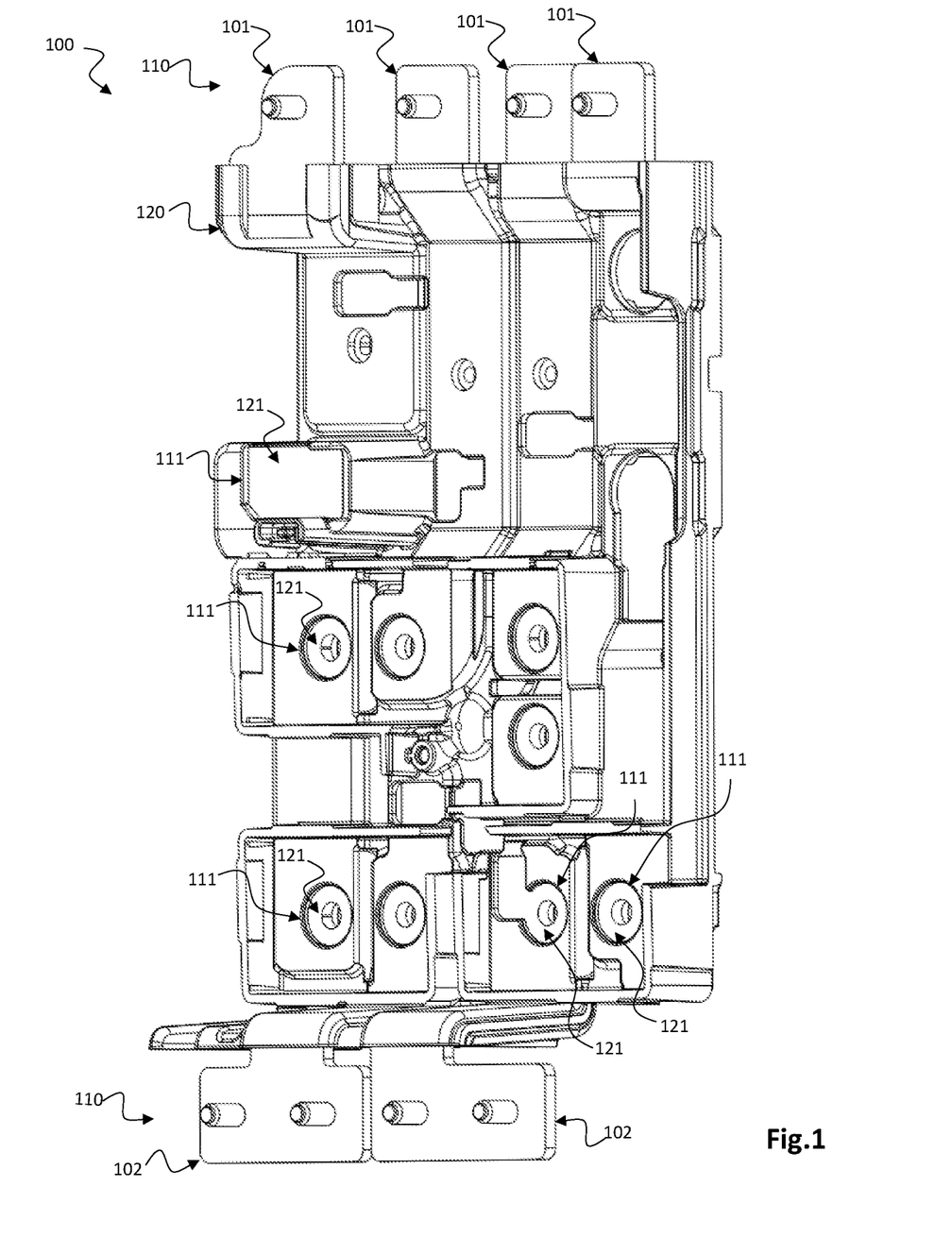
FIG. 1 depicts a 3D view of a multifunction carrier 100 in an embodiment without a connector for receiving the contactor according to the disclosure.

FIG. 1 shows a 3D view of a multifunction carrier 100 in a representation without a connector for receiving the contactor according to the disclosure.

Figure 3:
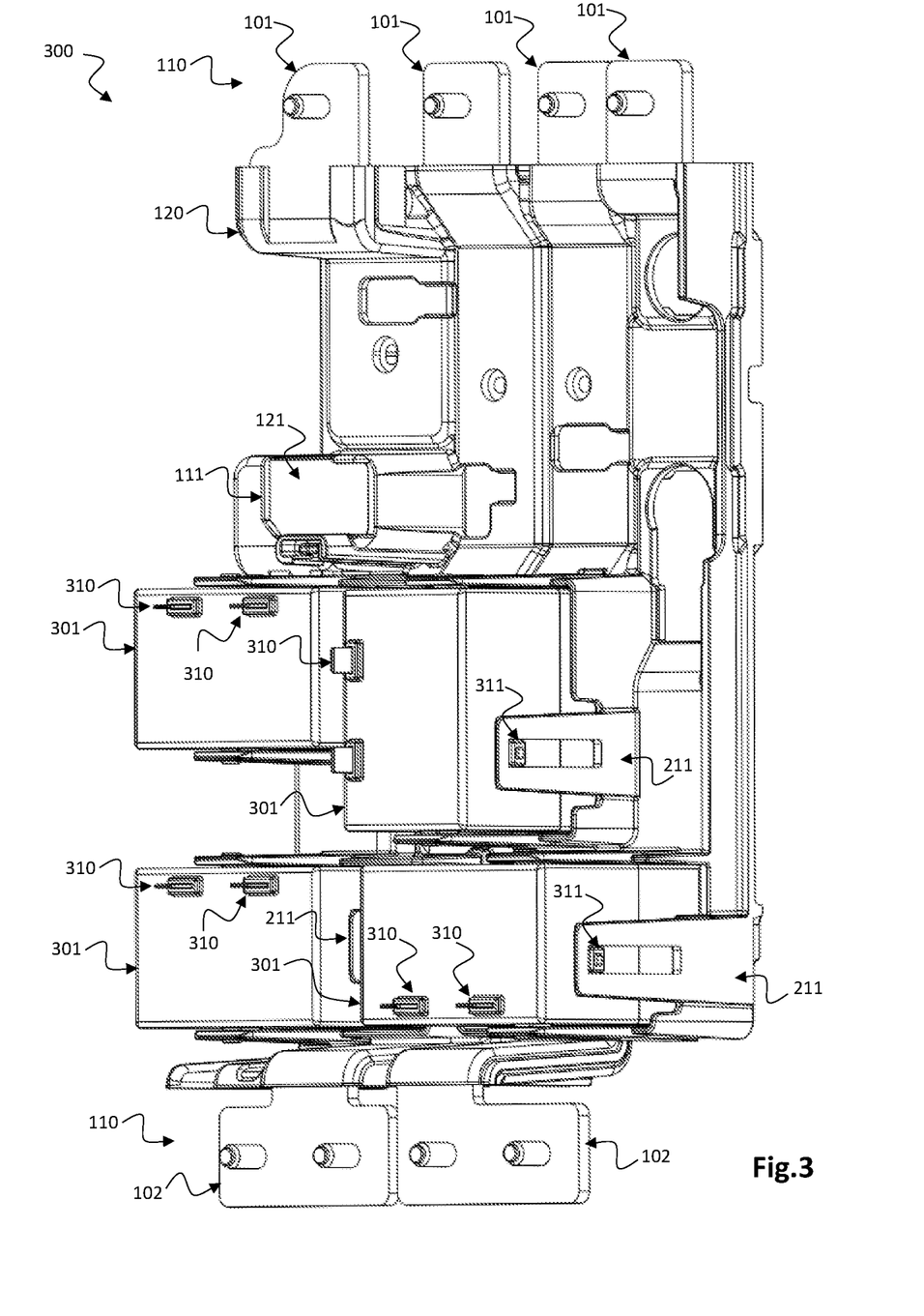
FIG. 3 depicts a 3D view of a multifunction carrier 300 in one embodiment with an integrated contactor according to the disclosure.
Figure 4:
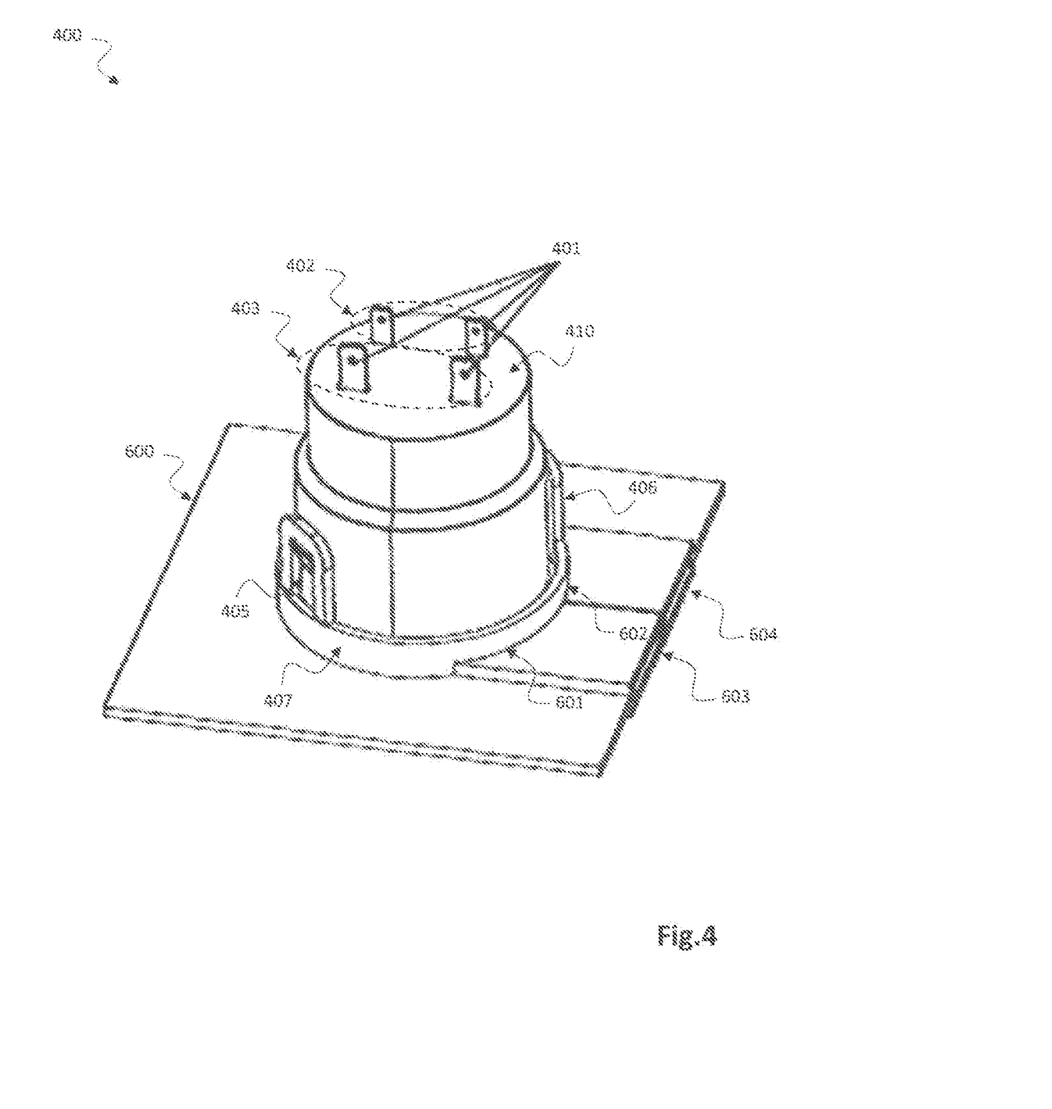
FIG. 4 depicts a 3D view of a high-voltage contactor 400 according to a first embodiment.
Figure 5:
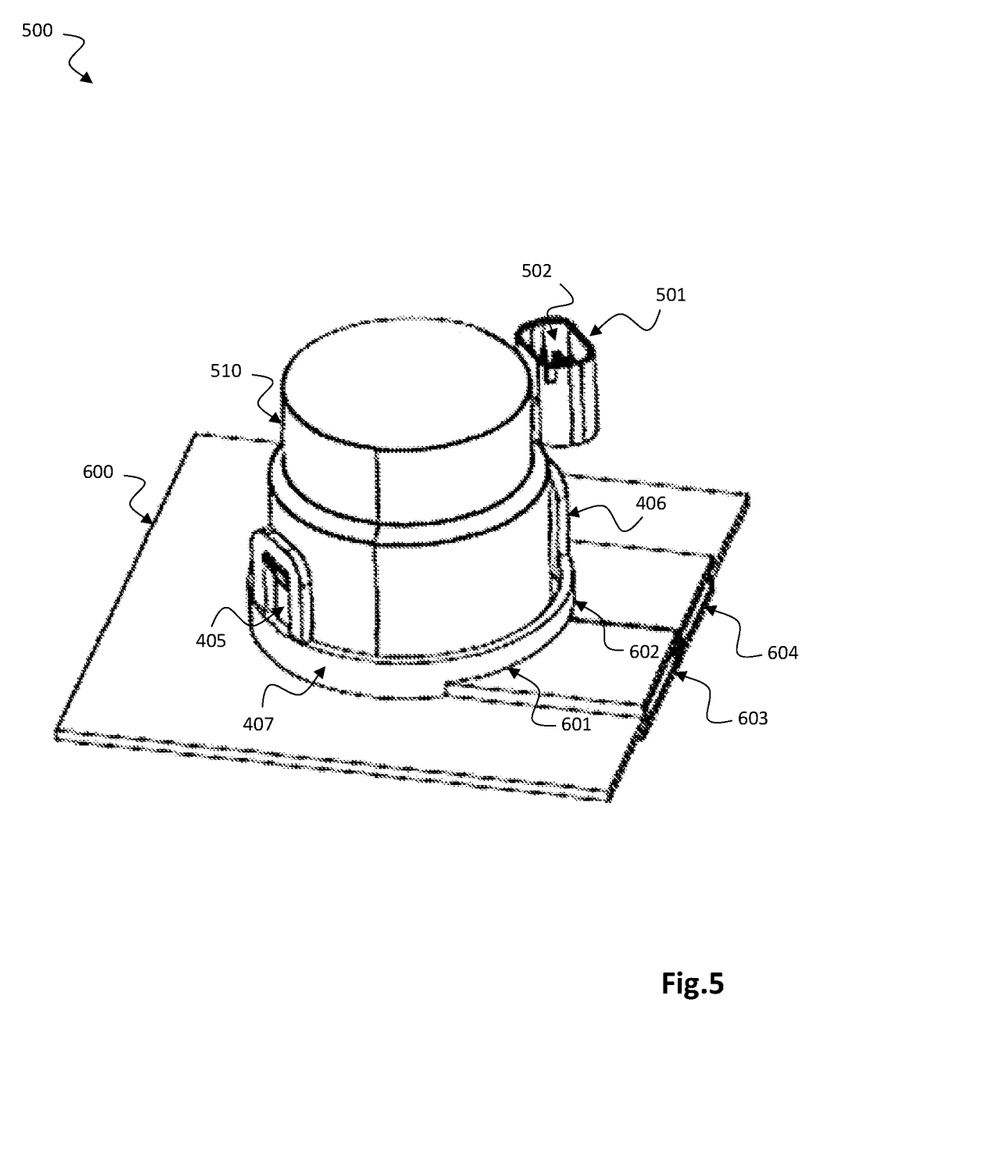
FIG. 5 depicts a 3D view of a high-voltage contactor 500 according to a second embodiment.

The multifunction carrier 100 is used to accommodate circuit components of a battery system for an electric vehicle, for example a high-voltage contactor 301, 400, 500 as shown in FIGS. 3, 4 and 5. Further, it can be used to accommodate other circuit components, such as cable assemblies, PCB connectors as well as other electrical components. The multifunctional carrier 100 comprises a busbar assembly 110 having at least one charging connection rail 101 and a drive connection rail 102; and an insulating housing 120 in which the busbar assembly 110 is embedded.

The insulating housing 120 has openings 111 which expose contact surfaces 121 of the connection rails 101, 102. Further, the insulating housing 120 comprises plug-in connectors, e.g. plug-in connectors 211, as shown in more detail in FIG. 2 which are designed to establish a pluggable mechanical and electrical contact between the circuit components 301, 400, 500 of the battery system with the open contact surfaces 121 of the connection rails 101, 102.

The multifunction carrier 100 ensures an appropriate electrical connection of the charging connection rails 101 with the drive connection rails 102 via the circuit components. For example, one or more HV contactor may switch on and off an electrical connection between a charging connection rail 101 and a drive connection rail 102, thereby enabling for switching on the drive by connecting to the battery or for switching off the drive by disconnecting from the battery.

The connecting rails 101, 102 may each comprise a positive path and a negative path. The positive path may be at HV potential, for example 400 to 800 V, while the negative path may be at ground.

An underside of the multifunctional carrier 100 (protruding into the drawing plane) may be provided for cooling the circuit components. For example, a thermally conductive plastic may be attached to the underside in order to dissipate the heat from the circuit components. Alternatively or additionally, a cooling system with cooling liquid may be guided over the underside in order to also dissipate the heat from the circuit components.

The connecting rails 101, 102 of the busbar assembly 110 can run in different planes, as shown in the 3D representation of FIG. 1. Thereby, a transition between the planes can be by bending the connecting rails 101, 102. Such bending can easily be realized by bending tools.

The open contact surfaces 121 of the connection rails 101, 102 may be respectively formed in the different planes of the busbar assembly 110 to provide a plurality of connection options.

FIG. 1 shows four charging connection rails 101 and four drive connection rails 102. However, other combinations of connection rails may also be implemented, for example, two charging connection rails 101 and two driving connection rails 102 or two charging connection rails 101 and four driving connection rails 102 or four charging connection rails 101 and two driving connection rails 102 or any other combination. The course of the connecting rails may be divided from left of the drawing to right of the drawing and form partial connecting rails which may be interconnected by corresponding circuit components. Any number of contact openings may be formed in the connecting rails to provide corresponding electrical connections.

Figure 2:
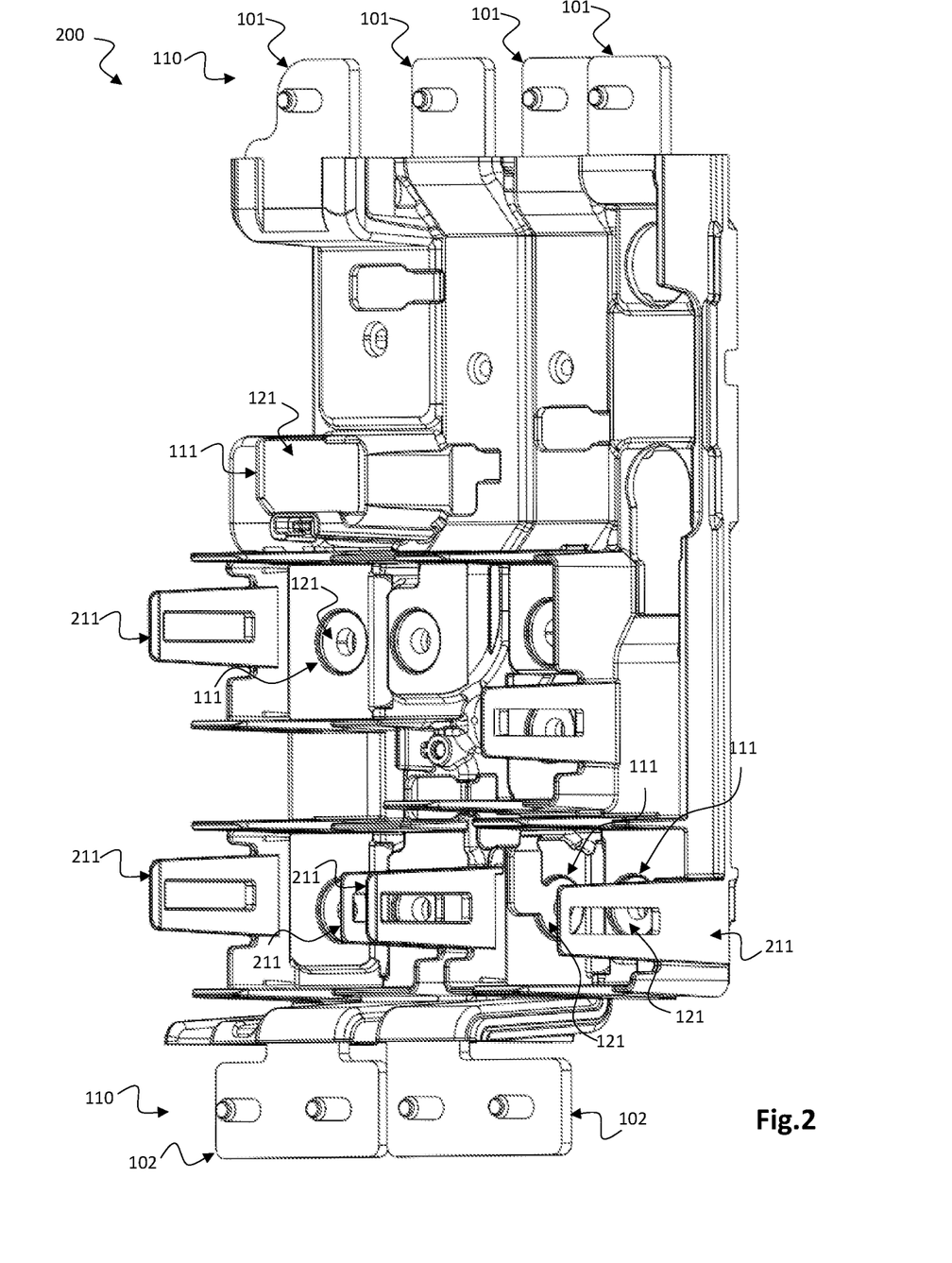
FIG. 2 depicts a 3D view of a multifunction carrier 200 in one embodiment with a connector for receiving the contactor according to the disclosure.

FIG. 2 shows a 3D view of a multifunction carrier 200 in a representation with connectors for receiving the contactor according to the disclosure.

The multifunction carrier 200 corresponds to the multifunction carrier 100 described in FIG. 1, but is shown here in FIG. 2 together with the connectors for receiving the contactor.

The multifunction carrier 200 is used to accommodate circuit components of a battery system for an electric vehicle, as described in FIG. 1 above. The multifunctional carrier 200 comprises a busbar assembly 110 having at least one charging connection rail 101 and a drive connection rail 102; and an insulating housing 120 in which the busbar assembly 110 is embedded.

The insulating housing 120 has openings 111 which expose contact surfaces 121 of the connection rails 101, 102. The insulating housing 120 further comprises plug connectors 211. The plug connectors 211 are designed to produce a pluggable mechanical and electrical contact between the circuit components 301, 400, 500 of the battery system and the open contact surfaces 121 of the connection rails 101, 102.

When the circuit components 301, 400, 500 of the battery system are plugged into the plug connectors 211, the plug connectors 211 are designed to engage in corresponding detents 311 on the circuit components 301, 400, 500, as shown in FIGS. 3, 4 and 5.

The plug connectors 211 may be elongated in shape and extend in a trapezoidal manner from the base side of the multifunctional carrier in the vertical direction from the base side, with the longer side of the trapezoid formed at the base side. The connectors 211 may have a slot in the middle, into which the corresponding detents 311 of the circuit components 301, 400, 500 can be inserted or engaged.

The insulating housing 120, together with the plug connectors 211, may be formed as a one-piece plastic part, such as an injection-molded part.

The connectors 211 may be formed on an upper side of the multifunction carrier 200, as shown in FIG. 2. The connectors 211 may be formed in different levels of the multifunction carrier 200, for example according to the bending path of the connection rails 101, 102.

FIG. 3 shows a 3D view of a multifunction carrier 300 in an embodiment with an integrated contactor according to the disclosure.

The multifunction carrier 300 corresponds to the multifunction carriers 100, 200 described in FIGS. 1 and 2, but is shown here in FIG. 3 with integrated circuit components 301, that is, with circuit components 301 plugged into the connectors 211.

The multifunction carrier 300 is used to accommodate circuit components of a battery system for an electric vehicle, as described above in FIG. 1 and FIG. 2. The multifunction carrier 300 comprises a busbar assembly 110 having at least one charging connection rail 101 and a drive connection rail 102; and an insulating housing 120 in which the busbar assembly 110 is embedded.

The insulating housing 120 has openings 111 which expose contact surfaces 121 of the connection rails 101, 102. Further, the insulating housing 120 comprises plug connectors 211. The plug connectors 211 are designed to produce a pluggable mechanical and electrical contact between the circuit components 301, 400, 500 of the battery system and the open contact surfaces 121 of the connection rails 101, 102.

The plug connectors 211 are designed to engage in corresponding detents 311 on the circuit components 301 when the circuit components 301 are plugged into the plug connectors 211.

The insulating housing 120, together with the plug connectors 211, may be formed as a one-piece plastic part, for example as an injection-molded part.

The connectors 211 may be formed on an upper side of the multifunction carrier 300. The connectors 211 can be formed in different planes of the multifunction carrier 300, for example according to the bending path of the connection rails 101, 102.

An underside of the multifunction carrier 300 (protruding into the drawing plane) may be provided for cooling the circuit components, as described above.

The connecting rails 101, 102 of the busbar assembly 110 may run in different planes, as shown in the 3D representation of FIG. 3. Here, a transition between the planes can be effected by bending the connecting rails 101, 102. Such bending can easily be achieved with bending tools.

The open contact surfaces 121 of the connection rails 101, 102 may each be formed in the different planes of the busbar assembly 110 in order to offer a plurality of connection options.

FIG. 3 thus represents a possible arrangement of a multifunction carrier 300 which can accommodate HV busbars 101, 102 (busbar assembly 110—also control and HV tapping), PCB connectors, wiring harness and electrical components. This can be fed fully automatically, can be welded at HV interfaces and allows mechanical inspection of secondary interlocks. Air and creepage distances can also be considered here due to the insulation with smaller dimensions. With a thermally conductive plastic, hot spots in the system can also be connected to a cooling system, for example.

The production of the multifunction carrier 300 may include the following production steps: injection of busbars 101, 102, clipping of HV-E components 301, routing or overmolding of a busbar assembly 110, overmolding of HV/LV wire set for direct plugging of LTGS (wire set), injection of plugs to contact electronics directly. All HV-STS (high-voltage busbars) assemblies 110 can be welded.

This allows the following advantages to be achieved: integration of all electrical components in one component; integration of wiring harness in this component without additional support; manual assembly steps are omitted; fully automated production is possible; elimination of many standard parts (for example screws/nuts) which eliminates the need to protect screw waste.

FIG. 4 shows a 3D view of a high-voltage contactor 400 according to a first embodiment.

The high-voltage contactor 400 is for a battery system of an electric vehicle. The high-voltage contactor 400 comprises a first high-voltage terminal 601; a second high-voltage terminal 602; an electrical switching element for switching on and off an electrical connection between the first high-voltage terminal 601 and the second high-voltage terminal 602; an insulating housing 407 which comprises the electrical switching element and has openings for the two high-voltage terminals 601, 602; and an interface 401 having a first pin for voltage tap at the first high-voltage terminal 601, a second pin for voltage tap at the second high-voltage terminal 601 Terminal 602, a third pin for controlling the electrical switching element, and a fourth pin for controlling the electrical switching element.

The first high-voltage terminal 601 may be plugged into a first connection rail 603 of a multifunctional carrier 600 for receiving circuit components of the battery system of the electric vehicle. The multifunction carrier 600 may be a multifunction carrier 100, 200, 300, as described above in FIGS. 1 to 3. The second high-voltage terminal 602 may be plugged into a second connection rail 604 of the multifunctional carrier 600. The connection rails 603, 604 may be, for example, a charging connection rail 101 and a drive connection rail 102, as described above with respect to FIGS. 1 and 2.

The high-voltage contactor 400 has at least two detents 405, 406 which are designed to engage when the high-voltage contactor 400 is plugged into corresponding plug connectors 211 of the multifunction carrier 100, 200, 300, 600, as shown, for example, in FIGS. 2 and 3, in order to establish a pluggable mechanical and electrical connection of the two high-voltage terminals 601, 602 with corresponding connection rails 603, 604, 101, 102 of the multifunction carrier 600.

The interface 401 may have two plug-in tongues 402 for pluggable voltage tapping at the two high-voltage terminals 601, 602 and two further plug-in tongues 403 for controlling the electrical switching element. Instead of the two pairs of plug-in tongues 402, 403, several pairs of plug-in tongues 402, 403 may also be realized, for example, to tap further voltages or to control signals.

The two pairs of plug-in tongues 402, 403 may be formed on a housing side 410 of the high-voltage contactor 400 facing away from the multifunctional carrier 600.

The high-voltage contactor can be cylindrical or conical or cuboidal, each with corresponding gradations. A stepped cone shape is shown in FIG. 4, a cuboid shape is shown for the HV contactor 301 in FIG. 3.

In FIG. 4, the two plug-in tongues 403 for the coil connection and the two plug-in tongues 402 may provide the tap of the HV signal respectively HV sense.

FIG. 5 shows a 3D view of a high-voltage contactor 500 according to a second embodiment.

The high-voltage contactor 500 may be similar in construction to the high-voltage contactor 400 described in FIG. 4.

The high-voltage contactor 500 comprises a first high-voltage terminal 601; a second high-voltage terminal 602; an electrical switching element for switching on and off an electrical connection between the first high-voltage terminal 601 and the second high-voltage terminal 602; an insulating housing 407 comprising the electrical switching element and having openings for the two high-voltage terminals 601, 602; and an interface 501 having a first pin for voltage tap at the first high-voltage terminal 601, a second pin for voltage tap at the second high-voltage terminal 601 Terminal 602, a third pin for controlling the electrical switching element, and a fourth pin for controlling the electrical switching element.

The first high-voltage terminal 601 may be plugged into a first connection rail 603 of a multifunctional carrier 600 for receiving circuit components of the battery system of the electric vehicle. The multifunction carrier 600 may be a multifunction carrier 100, 200, 300, as described above in FIGS. 1 to 3. The second high-voltage terminal 602 may be plugged into a second connection rail 604 of the multifunctional carrier 600. The connection rails 603, 604 may be, for example, a charging connection rail 101 and a drive connection rail 102, as described above in FIGS. 1 and 2.

The high-voltage contactor 500 has at least two detents 405, 406 which are designed to engage when the high-voltage contactor 500 is plugged into corresponding plug connectors 211 of the multifunction carrier 100, 200, 300, 600, as shown, for example, in FIGS. 2 and 3, in order to establish a pluggable mechanical and electrical connection of the two high-voltage terminals 601, 602 with corresponding connection rails 603, 604, 101, 102 of the multifunctional carrier 600.

The interface 501 has a plug in which the four pins 502 of the interface 501 are arranged. The connector may be a male or female connector. The connector may be designed for potential isolation, so that air and creepage distance or insulation are maintained in accordance with the requirements.

The connector may be formed on a lateral housing surface 510 of the high-voltage contactor 500 which extends in the vertical direction to the multifunction carrier 600, that is, out of the drawing plane of the FIG. 5.

Alternatively, the interface 501 may also be aligned to the side of the contactor at which the HV terminals 601, 602 are located.

The HV contactors, as described in FIGS. 3 to 5, offer the possibility of tapping the HV potentials of the two HV terminals 601, 602 by means of a plug-in system 501, 502 or flat plug-in tongues 402 integrated on the contactor 400, 500. This eliminates the need for additional ring cable lugs or flat plug tongues.

Such an HV contactor 301, 400, 500 is more cost-effective in production, for example by eliminating the screwdriving process, whereby only one plug-in is required instead. The switching state of each contactor (e.g. main contactor, DC charging contactor) can always be reliably detected. Furthermore, the absence of voltage in the system (as previously also with the ring cable lugs in the HV wiring harness) can be determined in a simple way.

The invention claimed is:

1. A multifunction carrier for receiving circuit components of a battery system for an electric vehicle, the multifunction carrier comprising:
    a busbar assembly comprising with at least one charging connection rail and a drive connection rail; and
    an insulating housing wherein the busbar assembly (110) is embedded,
    wherein the insulating housing comprises openings exposing contact surfaces of the connecting rails, and wherein the insulating housing comprise plug connectors configured to make a pluggable mechanical and electrical contact between the circuit components of the battery system and the open contact surfaces of the connection rails.

2. The multifunction carrier according to claim 1, wherein the connectors are configured to engage in corresponding detents on the circuit components when the circuit components the battery system are plugged into the connectors.

3. The multifunction carrier according to claim 1, wherein the insulating housing with the plug connectors is formed as at least one of a one-piece plastic part and an injection-molded part.

4. The multifunction carrier according to claim 1, wherein the connectors are formed on an upper side of the multifunctional carrier.

5. The multifunction carrier according to claim 1, wherein an underside of the multifunction carrier is arranged and configured for cooling the circuit components.

6. The multifunction carrier according to claim 1, wherein the connecting rails of the busbar assembly are arranged to extend in different planes and a transition between the planes is effected by bends of the connecting rails.

7. The multifunction carrier according to claim 6, wherein the open contact surfaces of the connecting rails are formed in different planes of the busbar assembly.

8. A high-voltage contactor for a battery system of an electric vehicle, comprising:
    a first high-voltage terminal;
    a second high-voltage terminal;
    an electrical switch element configured to switch on and off an electrical connection between the first high-voltage terminal and the second high-voltage terminal;
    an insulating housing comprising the electrical switching element and openings for the two high-voltage terminals; and
    an interface comprising:
        a first pin for voltage tap arranged at the first high-voltage terminal,
        a second pin for voltage tap arranged at the second high-voltage terminal,
        a third pin configured to control the electrical switching element, and
        a fourth pin configured to control the electrical switching element.

9. The high-voltage contactor according to claim 8, wherein the third pin and the fourth pin are configured to provide a coil connection of the electrical switching element for HV contactor control.

10. The high-voltage contactor according to claim 8,
    wherein the first high-voltage terminal is arranged plugged to a first connecting rail of a multifunction carrier for receiving circuit components of at least one of a battery system of the electric vehicle, and a multifunctional carrier, wherein the multifunctional carrier comprises a busbar assembly comprising with at least one charging connection rail and a drive connection rail; and an insulating housing wherein the busbar assembly (110) is embedded, wherein the insulating housing comprises openings exposing contact surfaces of the connecting rails, and wherein the insulating housing comprises plug connectors configured to male a pluggable mechanical and electrical contact between the circuit components of the battery system and the open surfaces of the connection rails; and wherein the second high-voltage terminal is configured to be plugged into a second connecting rail of the multifunction carrier.

11. The high-voltage contactor according to claim 10, further comprisin: at least two detents configured to engage when the high-voltage contactor is plugged into corresponding plug connectors of the multifunction carrier, in order to produce a pluggable mechanical and electrical connection of the two high-voltage terminals corresponding connection rails of the multifunction carrier.

12. The high-voltage contactor according to claim 10, wherein the interface comprises two plug-in tongues configured for pluggable voltage tapping at the two high-voltage terminals and two further plug-in tongues configured for controlling the electrical switching element.

13. The high-voltage contactor according to claim 12, wherein the plug-in tongues are formed on a housing side the high-voltage contactor facing away from the multifunction carrier.

14. The high-voltage contactor according to claim 10, wherein the four pins of the interface are arranged in a connector.

15. The high-voltage contactor according to claim 14, wherein the plug is formed on a lateral housing surface of the high-voltage contactor which extends in the vertical direction to the multifunctional support.

\* \* \* \* \*